May 9, 1967  B. F. LATHAM, JR., ETAL  3,318,664
METHOD AND APPARATUS FOR MAKING CARBON BLACK
Filed Dec. 4, 1964
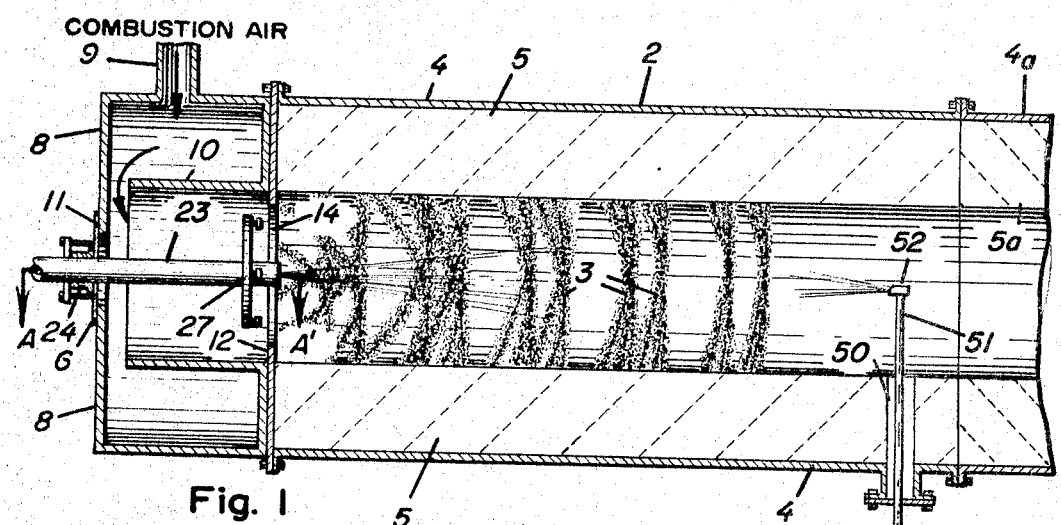
Fig. 1
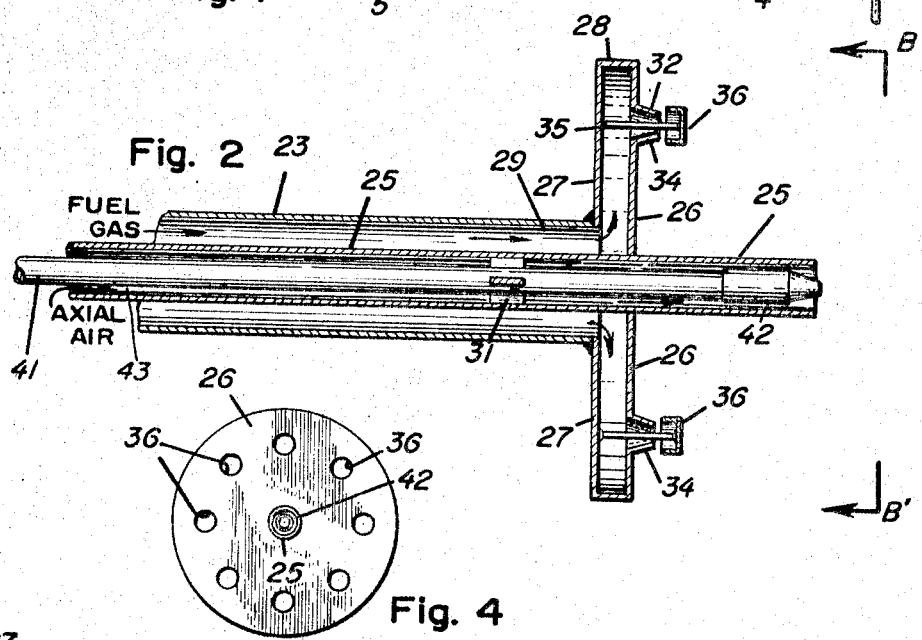
Fig. 2
Fig. 4
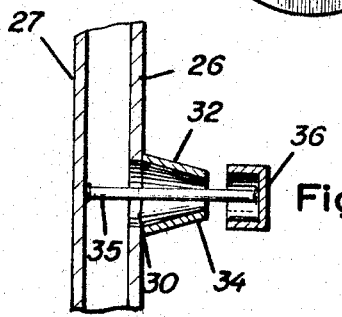
Fig. 3
Burton F. Latham, Jr.
Robert G. James
INVENTORS
BY L. David Trapnell
ATTORNEY.

United States Patent Office 3,318,664
Patented May 9, 1967

3,318,664
METHOD AND APPARATUS FOR MAKING CARBON BLACK
Burton F. Latham, Jr., and Robert G. James, Houston, Tex., assignors to Continental Carbon Company, Houston, Tex., a corporation of Delaware
Filed Dec. 4, 1964, Ser. No. 415,986
10 Claims. (Cl. 23—209.4)

This invention relates to carbon black, and more particularly to the making of carbon black in an apparatus which is generally characterized by an elongate cylindrical reactor, or combustion chamber, wherein the combustion air and fuel gas are mixed by turbulence, the air-gas mixture ignited, and the hydrocarbon (in mist or vapor form) introduced to the flame.

Apparatus of this general type is shown and described in Patent No. 2,976,127 to Burton F. Latham, Jr., and in Patent No. 3,087,796 to Burton F. Latham, Jr., and Theodore A. Ruble.

As pointed out in Patent No. 2,976,127 to Burton F. Latham, Jr., one of the present applicants, it is generally known in the art that the carbon black of superior grade and smaller particle size is obtained by high temperature cracking reaction which proceeds to its conclusion in the shortest possible time; and that the high temperature is attained by complete combustion of a fuel gas and the injection of hydrocarbon mist or vapor directly into the hot products of combustion. Among other things, it is well known that rapid mixing of the hydrocarbon mist or vapor with the hot products of combustion is essential for carbon black of the desired small-particle size.

The present invention seeks to provide an improved method and apparatus for making carbon black of the type described (i.e. furnace black) which produces vastly improved results from all aspects of the operation, as will be set forth more fully hereinafter.

As stated in our concurrently filed patent application Ser. No. 415,985 we have discovered that in the manufacture of furnace black, tremendously increased yield and production rates may be realized by the release of sonic energy in the combustion zone.

More specifically there is obtained
(1) much faster combustion of the fuel gas or fuel oil by
 (a) causing a faster and more uniform mixing of the combustion air and the fuel; and
 (b) direct bombardment of the reacting molecules with the high intensity sound wave;
(2) much finer dispersion of the feedstock hydrocarbon by sonic wave agitation of the same, either in the form of gas or as atomized droplets;
(3) much faster cracking of the feedstock to carbon and hydrogen with the sonic wave energy by
 (a) causing a breakdown of the surface gas films surrounding the oil droplets resulting in a more rapid heat transfer, or rapid diffusion of vaporized hydrocarbon; and
 (b) direct sonic bombardment of the cracking hydrocarbon molecules;
(4) carbon black of higher tint (i.e., smaller particle size) and higher oil absorption (higher chain structure).

The present invention comprises the novel features generally outlined hereinabove which will be fully described with reference to certain illustrative embodiments shown in the accompanying drawings, particularly adapted for use of a liquid feedstock though it is to be understood that the same basic apparatus can be used for a gaseous feedstock, in which FIGURE 1 is a longitudinal fragmentary elevation, partly in section, of a form of apparatus which may satisfactorily be used to practice the teachings of the present invention;

FIGURE 2 is an enlarged longitudinal view, partly in section as taken along section A–A' thereof, which illustrates the relationship of the means for feeding the feedstock oil hydrocarbon to the fuel gas and the air for supporting combustion;

FIGURE 3 is an enlarged view illustrating in greater detail some of the components of FIGURE 2; and FIGURE 4 is an end view on a reduced scale of the showing of FIGURE 2 along section B–B' thereof.

Referring more particularly to the drawings, in FIGURE 1 there is shown an apparatus which embodies the teachings of the present invention, the same being generally patterned after that of the aforementioned Latham Patent No. 2,976,127.

In a reactor designated generally as 2, there is suitably secured to one end of the elongate cylindrical housing 4, forming reaction chamber 3, a cylindrical air box 8 of similar diameter which is provided with a radially extending combustion air supply pipe 9.

A cylindrical air baffle 10 is concentrically mounted within the cylindrical air box 8, the same having approximately the same inside diameter as that of the refractory lining 5 within the cylindrical housing 4.

As shown in FIGURE 1, the side wall of the cylindrical air baffle 10 is imperforate; and its outer end is spaced from the inner surface of the outer end-wall of the cylindrical air box 8. This construction and arrangement permits the air entering the air box 8 from pipe 9 to be distributed around the annular space between the cylindrical air baffle 10 and the air box 8. From this point, the entering air is, as shown by arrows, distributed evenly around the annular opening at the outer end of the cylindrical air baffle 10 as it is moved into the latter.

Between the inner end-wall of the cylindrical air box 8 and the adjacent end of the reactor chamber formed by the elongate cylindrical housing 4 and its refractory lining 5 is a plate 12 having a large center orifice 14, said plate 12 optionally having smaller orifices in spaced relationship about the outer periphery of orifice 14.

Referring to FIGURE 2, the burner and hydrocarbon injection assembly is shown as comprising a tube 23 extending through the cover member 6 removably affixed to box 8 by suitable means and having a central aperture, a centrally disposed aperture 11 in the outer wall of the air box 8, and adjustably and removably secured in position by means of a packing gland 24. A tube 25 is disposed concentrically within the tube 23 and extends within the cylindrical chamber beyond the extremity of the tube 23 as shown. A vertically disposed centrally apertured disc 26 serves as a closure member for the annular spacing formed between tubes 23 and 25; the said disc having a diameter which is substantially greater than the outside diameter of the tube 23, and which is rigidly attached to the tube 25 by welding.

It will also be observed that a centrally apertured disc 27 is disposed behind and in adjacent parallelism with the disc 26; the same being secured at the edge of its central aperture to the downstream end of the pipe 23.

The peripheries of the parallel discs 26 and 27 are closed by an annular band 28 which may be suitably welded to these elements.

In the immediately aforementioned manner there is formed a hollow plate, or flameholder disc, the interior of which is in communication with the annular space between the pipes 23 and 25, thus forming a conduit 29.

Mounted on the outer face of the vertically disposed centrally apertured disc 26 is a series or array of sonic energy devices disposed in an evenly spaced annular pattern communicating with conduit 29 through apertures 30 in disc 26, each of said sonic energy devices comprising a gas nozzle body 32 which extends downstream in substantial parallelism with the axis of the concentrically disposed pipes 23 and 25.

The downstream end of each of the gas nozzle bodies 32 is provided with a choked nozzle or dispensing orifice 34. A rod 35 is disposed axially of each of the gas nozzles 32 with its outer end projecting therefrom and its inner end welded to the adjacent portion of the inner face of the disc 27.

To the outer and projecting end of each of the rods 35 there is secured a resonator cap 36 which forms part of a sonic energy generator as will appear more fully described hereinafter.

Fuel gas under high pressure is supplied from a suitable source to the conduit 29 between the pipe 23 and the smaller and concentrically disposed pipe 25; said gas passing between the parallel discs 26 and 27, through the gas nozzle bodies 32, and out of the choked nozzles or dispensing orifices 34.

In so doing, the compressed gas is emitted as a supersonic jet stream from each of the choked nozzles 34 and converted into sonic waves of compression and rarefaction by the cavity resonator (cap) 36. That is, the bevelled surface of each of the choked nozzles 34 provides a deflecting surface to high velocity sonic waves which are generated by the cavity resonator 36 and which build up as illustrated in broken lines in chamber 3.

Concentrically mounted within the tube 25 is a hydrocarbon feedstock supply pipe 41, which is positioned by spacers 31, the inner end of said pipe 41 having a spray nozzle 42 affixed thereto. As will be noted, the end of the spray nozzle 42 terminates practically flush with the inner (and downstream) end of the pipe 25. Axial air for partially supporting combustion is introduced into the downstream end of the pipe 25 through the annulus 43 formed by pipe 41, contacting the spray pattern created by the spray nozzle 42, this axial air cooling elements 25 and 42, and directing the spray pattern down the axis of chamber 3.

As previously stated, the bevelled surfaces of the choked nozzles 34 provide a deflecting surface to high velocity sonic waves which are generated by the cavity resonator 36.

The configurations of the surface of the choked nozzle and the cooperating surfaces of the resonator cup 36 are such that a low pressure area is formed adjacent the choked nozzles 34 and waves thereof moving in the manner illustrated to contact feedstocks emerging from the spray nozzle 42. The high intensity sonic wave action of alternate pressure and rarefaction operating on the fluid molecules causes turbulence within this field which results in rapid mixing of the fuel gas and the combustion air, resulting in combustion, and the dispersion or atomization of the hydrocarbon feedstock into a micromist for reaction in chamber 3.

In the foregoing manner thin streams of hydrocarbon are fed into the high intensity sonic energy fields. Constant-frequency sound waves within this field (at set frequency and low pressure) provide an effective chopping action, thus breaking the feedstock stream into an aerosol or mist.

The size of the particles is a function of flow, pressure, orifice size, and position of the resonators.

Referring to the right-hand portion of FIGURE 1 of the drawings, the cylindrical refractory reaction chamber is provided with a radial spray port 50 through which there extends a fluid quench pipe 51, the latter terminating adjacent the centerline of the reaction chamber 3 and being provided wtih a spray head 52 which is directed toward the instrumentalities described earlier herein, it being well known that several spray quenches may be used. The spray, such as water, delivered by the spray head 52 terminates the cracking action, and the reaction products exit the reactor as a hot gaseous effluent with the carbon black suspended therein.

The carbon black produced in the reactor is removed from the effluent gases by means of any of the collecting devices which are well known to the art; and the effluent gases are discharged to the atmosphere.

In the event additional reaction time is required, additional sections of the elongate cylindrical refractory reactor may be utilized, as indicated at 4a and 5a at the right-hand end of FIGURE 1; it being understood, however, that the quench spray would be positioned and used to terminate the reaction in the reactor section at a position appropriate for obtaining the type of carbon black desired.

The operation of the process comprises introducing combustion air through pipe 9 and fuel gas through conduit 29 into reaction chamber 3 for combustion which is adequate to bring the reactor to desired operating temperature, particularly the refractory lining 5. The hydrocarbon feedstock and axial air are supplied through pipes 41 and 25, respectively. The hydrocarbon feedstock upon being sprayed by nozzle 42 into the reaction chamber 3 is converted to a micromist by the sonic wave pattern of the fuel gas emitted through the sonic generation elements 32, 34 and 36, for the combustion reactors, forming a gaseous mixture of combusted gas and suspended carbon black, said reaction continuing until the quench provided by the spray head 52 terminates the reaction. The gaseous effluent is then passed from the reactor and the carbon black is recovered therefrom.

The present invention is well adapted to carry out the objects and attain the ends and advantages mentioned, as well as others inherent therein. While presently preferred embodiments of the invention have been given for the purpose of disclosure, numerous changes in the steps of the process and use of the apparatus may be made which will readily suggest themselves to those skilled in the art and which are encompassed within the spirit of the invention as defined by the appended claims.

What we claim is:

1. The method of making carbon black in an elongate cylindrical reactor which includes moving fuel gas into said elongate cylindrical reactor by sonic energy waves which emanate from a source which is spaced from the longitudinal axis thereof; injecting carbon black producing feedstock into and along the longitudinal axis of said elongate cylindrical reactor; introducing combustion air into said elongate cylindrical reactor in a path which is peripheral with respect to the path of the injected carbon black producing feedstock; igniting the mixture of fuel gas and combustion air; pyrolytically dissociating said carbon black producing feedstock to produce carbon black aerosol; and cooling the effluent and recovering the carbon black therefrom.

2. The method of making carbon black in an elongate cylindrical reactor which includes injecting carbon black producing feedstock into and along the longitudinal axis of said elongate cylindrical reactor; injecting combustion air into said reactor; moving fuel gas into said elongate cylindrical reactor and into contact with said combustion air by sonic energy waves which emanate from a source which is spaced from the longitudinal axis thereof; igniting the mixture of fuel gas and combustion air, pyrolytically dissociating said carbon black producing feedstock to product carbon black aerosol; and cooling the effluent and recovering the carbon black therefrom.

3. Apparatus for making carbon black comprising an elongate cylindrical reactor; means disposed along the longitudinal axis of said elongate cylindrical reactor for injecting carbon black producing feedstock thereinto; means disposed radially outward of said first-named means for supplying axial air; means for moving fuel gas into said elongate cylindrical reactor by sonic energy waves; said last-named means being disposed radially outward of said first and second named means; and means for supplying combustion air around said last-named means and into said elongate cylindrical reactor.

4. Apparatus for making carbon black comprising an elongate cylindrical reactor; means disposed along the longitudinal axis of said elongate cylindrical reactor for injecting carbon black producing feedstock thereinto; means disposed radially outward of said first-named means for supplying axial air; a plurality of means for moving fuel gas into said elongate cylindrical reactor by sonic energy waves; said last-named means being disposed radially outward of said first and second named means; and means for supplying combustion air around said last-named means and into said elongate cylindrical reactor.

5. Apparatus for making carbon black comprising an elongate cylindrical reactor; means disposed along the longitudinal axis of said elongate cylindrical reactor for injecting carbon black producing feedstock thereinto; means disposed radially outward of said first-named means for supplying axial air; a plurality of means for moving fuel gas into said elongate cylindrical reactor by sonic energy waves; said last-named means being disposed radially outward of said first and second named means and in evenly spaced relationship with respect thereto; and means for supplying combustion air around said last-named means and into said elongate cylindrical reactor.

6. Apparatus for making carbon black comprising an elongate cylindrical reactor; means disposed along the longitudinal axis of said elongate cylindrical reactor for injecting carbon black producing feedstock thereinto; means disposed radially outward of said first-named means for supplying axial air; a plurality of means for moving fuel gas into said elongate cylindrical reactor by sonic energy waves; said last-named means being disposed radially outward of said first and second named means and in evenly spaced relationship with respect thereto and with each other; and means for supplying combustion air around said last-named means and into said elongate cylindrical reactor.

7. Apparatus for making carbon black comprising an elongate cylindrical reactor; a pipe extending into said elongate cylindrical reactor; a spray nozzle carried by and communicating with the inner end of said pipe; means connecting said pipe with a source of carbon black producing feedstock; a second pipe disposed externally of said first pipe; means for supplying said second pipe with axial air; a third pipe disposed externally of said second pipe; at least one sonic energy generator communicating with said third pipe; said sonic energy generator being directed downstream with respect to said elongate cylindrical reactor; means for supplying said third pipe with a source of fuel gas under high pressure; and means for supplying combustion air around said sonic energy generator and into said elongate cylindrical reactor.

8. Apparatus for making carbon black comprising an elongate cylindrical reactor; a pipe extending into said elongate cylindrical reactor; a spray nozzle carried by and communicating with the inner end of said pipe; means connecting said pipe with a source of carbon black producing feedstock; a second pipe disposed externally of said first pipe; the inner end of said second pipe terminating proximate the end of said spray nozzle; means for supplying said second pipe with axial air; a third pipe disposed externally of said second pipe; at least one sonic energy generator carried by and communicating with said third pipe; said sonic energy generator being directed downstream with respect to said elongate cylindrical reactor; means for supplying said third pipe with a source of fuel gas under high pressure; and means for supplying combustion air around said sonic energy generator and into said elongate cylindrical reactor.

9. Apparatus for making carbon black comprising an elongate cylindrical reactor; a pipe extending axially into said elongate cylindrical reactor; a spray nozzle carried by and communicating with the inner end of said pipe; means connecting said pipe with a source of carbon black producing feedstock; a second and concentric pipe disposed externally of said first pipe; the inner end of said second pipe terminating proximate the end of said spray nozzle; means for supplying the space between said first and second pipes with axial air; a third and concentric pipe disposed externally of said second pipe; the inner end of said third pipe terminating short of the corresponding end of said second pipe; at least one sonic energy generator disposed radially of said third pipe; said sonic energy generator communicating with the space between said second and third pipes and directed downstream with respect to said elongate cylindrical reactor; means for connecting the space between said second and third pipes with a source of fuel gas under high pressure; and means for supplying combustion air around said sonic energy generator and into said elongate cylindrical reactor.

10. Apparatus for making carbon black comprising an elongate cylindrical reactor; a pipe extending axially into said elongate cylindrical reactor; a spray nozzle carried by and communicating with the inner end of said pipe; means connecting said pipe with a source of carbon black producing feedstock; a second and concentric pipe disposed externally of said first pipe; the inner end of said second pipe terminating proximate the end of said spray nozzle; means for supplying the space between said first and second pipes with axial air; a third and concentric pipe disposed externally of said second pipe; the inner end of said third pipe terminating short of the corresponding end of said second pipe; a hollow radial disc carried by said second and third pipes and communicating with the space therebetween; at least one sonic energy generator carried by and communicating with the interior of said hollow radial disc; said sonic energy generator being directed downstream with respect to said elongate cylindrical reactor; means for connecting the space between said second and third pipes with a source of fuel gas under high pressure; and means for supplying combustion air around said sonic energy generator and into said elongate cylindrical reactor.

References Cited by the Examiner
UNITED STATES PATENTS

| | | | |
|---|---|---|---|
| 2,934,410 | 4/1960 | Smith | 23—277 |
| 2,976,127 | 3/1961 | Latham | 23—259.5 |

MORRIS O. WOLK, *Primary Examiner.*

JAMES H. TAYMAN, Jr., *Examiner.*